(12) United States Patent
Neumueller

(10) Patent No.: US 12,415,967 B2
(45) Date of Patent: Sep. 16, 2025

(54) METHOD OF AND APPARATUS FOR INDUSTRIALLY OBTAINING RAPE CORE OIL AND RAPE PROTEIN CONCENTRATE FROM RAPESEED

(71) Applicant: Waldemar Neumueller, Friedland-Ballenhausen (DE)

(72) Inventor: Waldemar Neumueller, Friedland-Ballenhausen (DE)

(73) Assignee: Euro-Protein GmbH, Friedland (DE)

( * ) Notice: Subject to any disclaimer, the term of this patent is extended or adjusted under 35 U.S.C. 154(b) by 740 days.

(21) Appl. No.: 17/497,214

(22) Filed: Oct. 8, 2021

(65) Prior Publication Data
US 2022/0081642 A1 Mar. 17, 2022

Related U.S. Application Data

(63) Continuation of application No. PCT/EP2019/058957, filed on Apr. 9, 2019.

(51) Int. Cl.
*C11B 1/10* (2006.01)
*A23J 1/14* (2006.01)
(Continued)

(52) U.S. Cl.
CPC .............. *C11B 1/102* (2013.01); *A23J 1/142* (2013.01); *C11B 1/04* (2013.01); *C11B 1/06* (2013.01); *C11B 1/108* (2013.01)

(58) Field of Classification Search
CPC .......... A23J 1/142; C11B 1/102; C11B 1/142; C11B 1/04; C11B 1/06; C11B 1/108
See application file for complete search history.

(56) References Cited

U.S. PATENT DOCUMENTS 4,158,656 A 6/1979 Jones et al.
4,794,011 A 12/1988 Schumacher
(Continued)

FOREIGN PATENT DOCUMENTS

CN 1312358 A 9/2001
CN 105779108 A 7/2016
(Continued)

OTHER PUBLICATIONS

Guidelines for edible fats and edible oil, Deutsches Lebensmittelbuch, Bundesministerium für Ernährung und Landwirtschaft BMEL, Jul. 2, 2020 (Summarized in Specification).
(Continued)

*Primary Examiner* — Erik Kashnikow
*Assistant Examiner* — Assaf Zilbering
(74) *Attorney, Agent, or Firm* — Thomas | Horstemeyer, LLP

(57) ABSTRACT

In industrial processing, grains of rapeseed are dehulled. Cold-pressed rapeseed core oil is pressed from a low-hull grain fraction having at most 4 weight percent of hulls. In a press cake being generated, the cake temperature is limited to 70° C., and a first residual oil content is reduced to 8 to 28 weight percent of the dry matter. Pressurized steam is supplied, and the press cake is subsequently expanded to form collets. The steam is metered such that the press cake is temporarily heated to above 100° C. and the collets have a temperature of 80° C. to 95° C. after the expansion. The collets are extracted with an organic solvent, a second residual oil content being reduced to 2 weight percent or less of the dry matter. After the expansion, some of the collets are returned and mixed with the low-hull grain fraction in order to increase the friction when being pressed.

20 Claims, 2 Drawing Sheets

(51) Int. Cl.
*C11B 1/04* (2006.01)
*C11B 1/06* (2006.01)

(56) References Cited

U.S. PATENT DOCUMENTS

| | | | |
|---|---|---|---|
| 4,901,635 | A | 2/1990 | Williams |
| 9,351,514 | B2 | 5/2016 | Pickardt et al. |
| 10,577,558 | B2 | 3/2020 | Boerner et al. |
| 2009/0317512 | A1 | 12/2009 | Kellens et al. |
| 2011/0301074 | A1 | 12/2011 | Pickardt et al. |
| 2012/0009287 | A1 | 1/2012 | Pickardt et al. |
| 2012/0130099 | A1 | 5/2012 | Wittenberg et al. |
| 2012/0253015 | A1 | 10/2012 | Chajuss |
| 2012/0276276 | A1 | 11/2012 | Rass et al. |
| 2013/0001333 | A1* | 1/2013 | Rass ............... A23L 13/20 241/2 |
| 2015/0073127 | A1 | 3/2015 | Wnukowski et al. |
| 2019/0078115 | A1 | 3/2019 | Hipskind et al. |

FOREIGN PATENT DOCUMENTS

| | | | | |
|---|---|---|---|---|
| DE | 2421270 | A | * 12/1974 | ............... A23J 1/14 |
| DE | 3529229 | C1 | 5/1986 | |
| DE | 4035349 | A1 | 5/1992 | |
| DE | 4041994 | A1 | 7/1992 | |
| DE | 102009022279 | A1 | 12/2009 | |
| DE | 2783576 | B1 | 10/2014 | |
| EA | 0026579 | B1 | 4/2017 | |
| EP | 1074605 | A1 | 2/2001 | |
| EP | 1228701 | A1 | 8/2002 | |
| EP | 1074605 | B1 | 8/2003 | |
| EP | 2783576 | A1 | 10/2014 | |
| EP | 3550004 | A1 | 10/2019 | |
| EP | 3550004 | B1 | 9/2020 | |
| EP | 3295803 | B1 | 2/2021 | |
| RU | 2281320 | C2 | 8/2006 | |
| RU | 2596039 | C2 | 8/2016 | |
| RU | 2685396 | C1 | 4/2019 | |
| RU | 2729822 | C2 | 8/2020 | |
| WO | WO9600017 | A1 | 1/1996 | |
| WO | 2010096943 | A2 | 9/2010 | |
| WO | 2011029611 | A2 | 3/2011 | |
| WO | 2011161665 | A1 | 12/2011 | |
| WO | WO2020207565 | A1 | 10/2020 | |

OTHER PUBLICATIONS

Master Thesis Sofia Dahlberg, Lunds Universitet Sweden, 2017, "An investigation of rapeseed protein as a new food product".
"Cold-pressed rapeseed oil" in http://en.foodlexicon.org/r0000680.php, Aug. 1, 2014.
"Leitsätze für Speisefette und Speiseöle", Deutsches Lebensmittelbuch, Bundesministerium für Ernährung und Landwirtschaft, Neufassung vom Jul. 2, 2020 (BAnz AT Aug. 18, 2020 B3, GMBl 2020 S. 530)—Summarized in Specification.
http://en.foodlexicon.org /r0000680.php.
Mulder, Wim et al.: Primary processing. In: Advanced oil crop biorefineries, Cambridge, RSC Publ. 2012, p. 102-165.
Stibora, Eric. "Utilization of Expanders to Maximize Oil Recovery on Pre-Press Cake", Anderson International Corp., published Oct. 23, 2017 [accessed online Mar. 10, 2025] (Year: 2017).

* cited by examiner

METHOD OF AND APPARATUS FOR INDUSTRIALLY OBTAINING RAPE CORE OIL AND RAPE PROTEIN CONCENTRATE FROM RAPESEED

CROSS REFERENCE TO RELATED APPLICATIONS

This application is a continuation to International Application PCT/EP2019/058957 with an international filing date of Apr. 9, 2019 entitled "Method and device for industrially obtaining rapeseed kernel oil and rape protein concentrate from rapeseed", which is incorporated herein by reference.

FIELD OF THE INVENTION

The present invention generally relates to a method of and an apparatus for processing grains of a rapeseed for obtaining oil.

Following to soybean, rape (*Brassica napus*) inclusive of so called 0 rape, 00 rape and 0+ rape varieties and canola, is the commercially most important oilseed worldwide and a high value resource for the foodstuff industry, the feeding stuff industry, the biodiesel production and the oleo chemistry. In contrast to soybean, which primarily serves as a supply of vegetable protein, rape is primarily grown for obtaining oil. Mainly, rape oil is processed to biodiesel and edible oil. In obtaining rape oil from rapeseed, a residue remains, which in case of only pressing the rape oil is designated as rape cake and after, possibly additional, solvent extraction is designated as coarse colza meal. Even the coarse colza meal remaining after additional solvent extraction accounts for about 60% of the starting material. Thus, it accrues in large amounts. In its use as animal feeding stuff no usage as the only feeding stuff is possible as opposed to coarse soy meal. Toxins, anti-nutritive ingredients and the high-hull fraction are in conflict with a use as the only feeding stuff and with its usage in foodstuff industry, although the contained rape protein, in principle, has an amino acid composition which is favorable for the use in feeding humans and animals. Correspondingly, the market price of coarse colza meal is clearly lower than that one of coarse soy meal. At the same time, there is a high demand for proteins suitable for feeding purposes, particularly of non-gene-modified sources. A high need of such proteins, for example, exists in fish farming in aquacultures and in poultry feeding.

In order to make the rape protein which is contained in the residues from obtaining oil from rapeseed usable at least as feeding stuff at a large industrial scale, it is necessary to reduce or remove the toxins and other troublesome associated material. Further, the protein content should preferably be increased to the level of coarse soy meal and soy protein concentrate produced therefrom.

BACKGROUND OF THE INVENTION

At a large scale, oil from rapeseed is obtained in a mechanical and/or chemical way. In obtaining mechanically, the oil is pressed, hot or cold, from the grains of the rapeseed.

According to the general opinion, so called cold-pressed rape core oil accrues, if temperatures below 50° C. are kept in pressing. However, the Codex Alimentarius defines cold-pressed oil in that no heat is added in pressing. Within the definition of the Codex Alimentarius, the residual oil content of a press cake being generated in pressing from rapeseed may be reduced to about 15% by weight of its dry matter.

According to the guidelines for edible fats and edible oil, Deutsches Lebensmittelbuch, Bundesministerium für Ernahrung and Landwirtschaft BMEL, trans-fatty acids of not more than 0.2% are demanded for cold-pressed oil. Values of more than 0.2% trans-fatty acids are indicative of heat damages.

By pressing even at higher temperatures, wherein, however, no cold-pressed rape core oil accrues, the residual oil content in the press cake may be reduced further.

If the grains of the rapeseed are dehulled prior to pressing to obtain a hull-free press cake, the residual oil content of the press cake is significantly above 15% with cold-pressing only, due to the lack of friction caused by the hulls. Thus, the first cold-pressing is often followed by a second hot-pressing at an increased temperature to raise the yield of oil.

Hull-containing press cakes are subsequently extracted with hexane, wherein the residual oil content is reduced down to below 1% by weight, and coarse colza meal remains which is of limited value only.

In many cases, press cakes remaining from pressing cold-pressed oils are not subsequently extracted with solvents because this would be uneconomic for small oil mills due to the necessary high investment costs and the safety requirements.

In order to make the oils from a hot-pressing or the hexane extraction suitable for foodstuff, a refinement process has to follow.

A method and an arrangement for dehulling rapeseed, in which a combined pressure and impact treatment of the grains of the rapeseed is applied to reduce the hull percentage to less than 5%, are known from German patent application publication DE 40 41 994 A1. In the known method, the following steps are executed after cleaning the grains: classifying the grains and separating small sizes, reducing the moisture content of the grains by drying, pressure treatment by rolling using a roller nib which is 0.2 to 0.4 times the average seed diameter, impact separation of the broken up hulls from the cores of the grains by pneumatic conveying, air separation plus classification and separation of the hulls from the cores by electro-separation. For this purpose, a seed hopper, scales, an iron collector, a classification deck, a dryer, a roller dehuller, a cyclone, an air separator and an electro-separator are connected in series. Obtaining rape core oil from the cores may follow to the rape dehulling.

DE 40 41 994 A1 assumes that the grains reach the reduced moisture for the dehulling by storage for more than three months or that fresh rapeseed is heated up to a temperature of 95° C. for drying. Long storage times require a high storage capacity with corresponding investments in large storage silos which is uneconomic and nevertheless does not assure that the rapeseed comprises the moisture suitable for dehulling consistently and uniformly in all of its parts. To keep up a reproducible and continuous production, it is unavoidable to dry the seed in a controlled and reproducible way. At 95° C. this happens at a temperature at which the denaturation of rape protein occurs, see, for example, Master Thesis Sofia Dahlberg, Lunds Universitet Sweden, 2017, "An investigation of rapeseed protein as a new food product".

To make the dehulling effective, the subsequent impact separation of the broken up hulls is required. By impact separation, additional pressure is exerted to the dehulled cores, wherein, due to the pressure at the impact, oil out of the cores gets to their surfaces and hinders the separation of the hulls. Thus, a high portion of broken cores sticks to the hulls. A separation of the cores from the loose hulls takes place via cyclones, air separators and electro-separation, wherein it is the task of the air separators to separate non-dehulled grains.

The electro-separation, which until today has found no use in large scale rape processing, because considerable problems are associated with the required high voltage field and because the hull separation loses efficiency at high throughputs, serves for the actual separation of the hulls.

A method and a device for producing edible oil from rapeseed are known from European patent application publication EP 1 074 605 A1 and corresponding European patent EP 1 074 605 B1. Here, the rapeseed is separated into fractions of different particle sizes by classifying. The cleaned and classified rapeseed is dried at below 40° C. The dried rapeseed is broken up. The broken rapeseed is then separated into three fractions of different particle sizes, one fraction of which, that is called usable fragments, is separated into dehulled rape and hulls. The dehulled rape is wetted and subsequently flaked. Afterwards the dehulled rape is cold-pressed in a press to obtain cold-pressed rape core oil. Like the other byproducts of the known method, the press cake accruing here may be used as feeding stuff. Alternatively, an energetic use of the separated byproducts, particularly of the hull fraction, is proposed.

Drawbacks of this known method are that, on the one hand, the drying of the rapeseed shall take place at temperatures below 40° C. and thus requires a large drying unit with a high demand of space, and, on the other hand, three fractions are formed in breaking the dried rapeseed which have to be classified. Thus, after the cleaning, the classification starts once again with the broken up rapeseed.

Of the three fractions, only the dehulled rape of the usable fragments are processed further. All other components of the rapeseed are disposed together with the hulls of the usable fragments, what makes this process uneconomic as the largest part of the rapeseed is not used for obtaining oil.

International application publication WO 2011/029 611 A2 and US patent application publications US 2012/0 276 276 A1 and US 2013/0 001 333 A1 belonging to the same patent family describe a method of processing grains of a rapeseed, wherein the grains are dehulled and separated into core fractions, on the one hand, and hull fractions, on the other hand, and wherein the core fractions are subjected to one or more pressings for obtaining oil. The method is carried out such that a dry matter and oil containing press cake remaining from the oil obtaining is put out directly or after a further milling step as a base, filler or additive for human food. In putting out a base for human food, the hull-free press cake may be milled. The milled material may be de-oiled by extraction and afterwards be used as a basis for a protein concentration and/or protein isolation.

A method of producing soy protein concentrate from white soybean flakes is known from international application publication WO 2011/161 665 A1 and US patent application publication US 2012/0 253 015 A1 belonging to the same patent family. For removing oil, the soybean flakes are extracted with hexane in a continuously operating hexane extractor. After partially stripping the hexane, the flakes are transferred into an aqueous alcohol extractor to extract the remaining hexane, sugars and other alcohol soluble material.

A method of producing a detoxicated protein concentrate product from defatted oilseed, particularly rapeseed, is known from U.S. Pat. No. 4,158,656. Here, the grains of the oilseed are dried to below 6% moisture, dehulled and afterwards further dried to 1 to 3% moisture and then extracted with hexane. The dehulled and de-oiled cores of the oilseed are then extracted under non-oxidizing conditions using an aqueous alcohol solvent, preferably isopropanol with added bisulfite, and the dry matter remainder of the extraction is dried at temperatures below 60° C.

It is a disadvantage of this known method that the plant cells of the dehulled cores are not broken up by pressing to be able to extract the oil more easily and completely. Further, the hexane extraction directly starts at the dehulled cores which considerably hinders a sufficient de-oiling and results in long extraction times. Further, no high value cold-pressed rape core oil is obtained, and the addition of an antioxidant is necessary. Cold-pressed native oils may not contain such additives.

A method of obtaining native organic substances, particularly oils, fats, waxes, dyes, vitamins and/or other lipophilic substances and their derivatives from native matters by means of centrifugal force is known from European patent application publication EP 1 228 701 A1. For this purpose, a starting material is comminuted, the lipophilic substances are extracted from the comminuted starting product by means of an extraction agent, and the slurry is separated in a centrifugal field into an aqueous phase containing solid components and a liquid organic phase which contains the hydrophobic substances.

A method of producing a protein preparation from rapeseed including a dehulling of the grains of the rapeseed, a mechanic de-oiling in which only a part of the oil is separated and which is carried out at a temperature of below 80° C. averaged over the period of the pressing step, and an extraction is known from international application publication WO 2010/096 943 A2 and US patent application publication US 2011/0 301 074 A1 belonging to the same patent family. In the mechanical de-oiling, which is carried out at the temperature below 80° C. averaged over the period of the pressing step, only a part of the oil is separated. In the extraction, protein foreign matters are depleted from the protein meal. Subsequently to the extraction, a classification with regard to the particle size takes place to obtain a bulk material of a predetermined particle size distribution. In practice, the known method starts with dehulling the grains of the rapeseed by dissociation in an impact mill and separation into a core-rich core fraction and a hull-rich fine fraction in an airstream of a zigzag separator. The core fraction is then cold-pressed in a screw press at temperatures between 30 and 45° C. down to a residual oil content of about 23% by weight, wherein the press cake is obtained in form of compressed strings called press cake pellets. The press cake pellets are then de-oiled with hexane in a Soxhlet apparatus down to a residual oil content below 3%. Then, the solvent is removed in an airstream at room temperature. The extracted protein meal pellets obtained in this way are treated without further comminution in an ethanol solution in a percolation process. The ready protein concentrate accruing therefrom is used with or without subsequent comminution.

WO 2010/096 943 A2 assumes that the rapeseed is already dried during storage at temperatures below 95° C., preferably below 40° C., wherein it is the goal to achieve an enzyme deactivation and a limited protein denaturation. However, temperatures below 40° C. do neither cause an enzyme deactivation nor a protein denaturation. Afterwards, the grains of the rapeseed are divided in a mill into a core fraction and a hull fraction, wherein the hulls are opened by bursting but not by purposefully breaking them.

In the mechanical de-oiling, which is carried out at a temperature below 80° C. averaged over the period of the pressing process, a limit temperature of 40° C., which according to common opinion has to be kept for a good cold-pressed rape core oil (http://en.foodlexicon.org/r0000680.php) is exceed in the rape core oil.

Besides its direct use, the press cake can be pressed into pellets at the output of the screw press. Soft oil seeds, like for example dehulled rapeseed, can only be pressed slowly and at low power due to the missing friction of the press cake being generated. If the output of a screw press is partially closed by a pellet die-plate, the inner pressure and the resistance in the screw press are increased so that the squeezed soft oilseed can be hardly conveyed by the press screw of the screw press. Thus, parts of the oilseed pass through the sieve box of the screw press together with the pressed-off oil and contaminate the oil.

Further, as described in WO 2010/096 943 A2 itself, already in pressing the press cake into pellets of a residual oil content below 17 discolorations become apparent, what indicates a considerable protein denaturation. If the press cake according to WO 2010/096 943 A2 nevertheless comprises a residual oil content of as little as at least 10%, a monumental protein denaturation is to be assumed.

To achieve a purity of the dehulled cores of below 5% or 1% as requested by WO 2010/096 943 A2, a considerable loss of cores has to be expected in air separating, because lightweight cores and hull accumulations of the same weight are discharged together. The core parts discharged together with the hulls are no longer available for the overall process and deteriorate the efficiency of the known method. A large scale application of the known method has not yet taken place.

A method and an arrangement for obtaining oil from leguminous and oilseeds in which the grains, for example of rapeseed, are processed by preparing platelets, to which a moistening of these platelets with subsequent expansion at 105 to 125° C. with subsequent cooling below 100° C. and drying as well as pressing at temperatures <100° C. to a residual oil content of 15 to 25% follows, are known from DE 40 35 349 A1. A press cake being generated in pressing is extracted at temperatures of about 65° C.

This known method starts from non-dehulled leguminous and oilseeds. These seeds are subjected to an expander treatment at temperatures of 105 to 125° C. without previous cold-pressing. Only after cooling down the expanded material to 65° C., the oil is pressed off. Thus, the expander has the function of a cell disruption by cooking to ease the pressing of the oil.

It is a disadvantage that the production of high value cold-pressed core oils of low-hull leguminous and oilseeds is not possible in this way. Further, with the temperatures applied, a protein denaturation occurs which complicates a further purification and production of proteins.

A method and an apparatus for thermally conditioning oilseeds and oil fruits, particularly leguminous seeds, for the production of oils and fats, on the one hand, and of an oil- or fat-free coarse meal suitable as concentrated food, on the other hand, are known from German patent DE 35 29 229 C1 and U.S. Pat. No. 4,794,011 belonging to the same patent family. Here, the cleaned, dried and comminuted oilseeds and oil fruits, subsequent to a previous flat rolling, are for a short time heated up to temperatures above 105 up to 148° C. at an over-atmospheric pressure and in an air- and oxygen-free atmosphere, and afterwards abruptly de-pressurized with simultaneously cooling down to temperatures below 100° C. In this way, it is achieved that the urease activity in the coarse meal is inhibited to a far extent and that the proteins as a hole as well as their water solubility are conserved to a considerable extent. The known thermal conditioning may take place subsequent to a pressing and prior to an extraction, in which an extraction temperature of 50 to 65° C. is adjusted. With regard to rapeseed, it is particularly proposed to condition the flat rolled grains at first under comparatively mild conditions, to then press the warm material for obtaining rape core oil, to then once again thermally condition the press cake at raised conditions, to cool it down, and to extract it at the end in a known way. In this way, it shall be possible to optimally obtain the oil content of the hulls and to achieve a clear separation of pressed rape core oil from the cores and extracted oil from the hulls.

In this known method, only non-dehulled oilseeds are used. The expander replaces a cooking process prior to the extraction. High value cold-pressed core oils are not obtained. With rape, the high temperatures result in protein denaturation.

European patent application publication EP 2 783 576 A1 and corresponding European patent EP 2 783 576 B1 describe a method of producing rape protein concentrate by processing grains of a rapeseed. The grains are dehulled to obtain a rape core fraction. The rape core fraction is partially de-oiled in a screw press. 5 to 60% of a press cake formed here are returned and mixed with the rape core fraction upstream of the screw press to increase the friction and the pressure in the screw press. The remainder of the protein containing press cake is washed with an aqueous alcohol solution to at least partially remove sugars, tanning agents, sinapines and glucosinolates and to produce a rape cake protein concentrate having a residual oil content of 5 to 25% (w/w). The rape cake protein concentrate is dried at temperatures in a range from 60 to 120° C., until its water content is lower than 10%. The rape core fraction may upfront be heated up to 70° C.

It cannot be taken from EP 2 783 576 A1 whether the press cake is added to the rape core fraction directly or broken, and whether the efficiency of the pressing is increased in this way.

The proportion of the hulls in pressing oil from non-dehulled rape is about 15%. When pressing in a screw press, the friction which is necessary to build up a high pressure and to thus achieve a high pressing performance is built up by means of the hulls. As EP 2 783 576 A1 indicates a hull portion of the rape core fraction of 1 to 10%, it may be assumed from the amount of the returned press cake that the increase of the friction by means of the returned press cake is not very effective. The actually best return ratio is indicated with 1:0.25, wherein the press cake, prior to the pressing, is heated up to 70° C. Here, to 1 ton of rape core fraction, 250 kg press cake are added, which, in the material to be pressed, then corresponds to about 20% press cake in addition to the 1 to 10% hulls. In other words, 20% press cake compensate for a loss of about 5 to 10% hulls which occurs with dehulling the grains.

It has to be regarded as a disadvantage that there is a considerable danger of a germ infestation of the screw press due to the press cake returned again and again. The temperature of the press cake remains so low that no pasteurization of the press cake takes place. A germ infestation of the screw press results in a toxin load to the press cake and to a carryover of the germs and toxins into oil products of the known method.

Even if the germ infestation of the press cake is afterwards annulled with the alcohol-water-extraction, the danger of a toxin load remains. To get rid of the germ infestation and the toxin load, the screw press has to be cleaned and to be disinfected often which each times means a downtime of the production. Thus, the industrial applicability of the known method is limited.

Additionally, the protein content of the rape cake protein concentrate does not fulfill the definition of a protein concentrate deduced from soy protein concentrate which requires a protein content related to the dry matter of above 60%. Due to the lower protein content of the rape cake protein concentrate it is a rape protein meal only.

There still is a need of a stable, reproducible and continuous method and an apparatus for its execution by which, besides high value cold-pressed rape core oil, protein containing products are obtained from rapeseed at low cost, which may be further processed into high value feeding and foodstuffs, wherein a largescale applicability of the method and the apparatus are ensured.

SUMMARY OF THE INVENTION

The present invention relates to a method of processing grains of a rapeseed. The method comprises the steps of dehulling the grains, wherein the grains are passed through a roller nip between dehulling rollers; separating a high-hull grain fraction from a low-hull grain fraction by sieving and/or air separation such that the hulls remaining in the low-hull grain fraction do not account for more than 4% by weight of the low-hull grain fraction; and pressing cold-pressed rape core oil from the low-hull grain fraction, wherein a water content of the low-hull grain fraction is from 4 to 7% by weight, wherein a cake temperature in an press cake being generated is limited to 70° C., and wherein a first residual oil content is reduced to 18 to 28% by weight of a dry matter of the press cake. The method further comprises the steps of supplying pressurized steam to the press cake and subsequently expanding the press cake to form collets, wherein the steam is metered such that the press case, under the influence of the steam, is temporarily heated up above 100° C. and the collets, after the expansion, have a temperature from 80° C. and 95° C.; extracting the collets with an organic solvent, wherein a second residual oil content is reduced to 2% by weight or less of a dry matter of the collets; separating a part of the collets prior to or after extracting the collets with the organic solvent, and adding the separated part of the collets to the low-hull grain fraction prior to the step of pressing.

The present invention also relates to an apparatus for processing grains of a rapeseed. The apparatus comprises dehulling rollers forming a roller nip configured for dehulling the grains; a separation device arranged downstream of the roller nip and comprising at least one sieve or air separator configured for separating a low-hull grain fraction from a high-hull grain fraction; flaking rollers arranged downstream of the separation device and configured for rolling the low-hull grain fraction to flakes; and a screw press arranged downstream of the flaking rollers and configured for pressing cold-pressed rape core oil from the flakes and for putting out a press cake. The apparatus further comprises an expander arranged downstream of the screw press and configured for supplying pressurized steam to the press cake and for subsequently expanding the press cake to form collets; an extractor arranged downstream of the expander and configured for extracting the collets with an organic solvent; and a returning device configured for separating a part of the collets prior to or after extracting the collets with the organic solvent, and for adding the separated part of the collets to the low-hull grain fraction upstream of the screw press.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
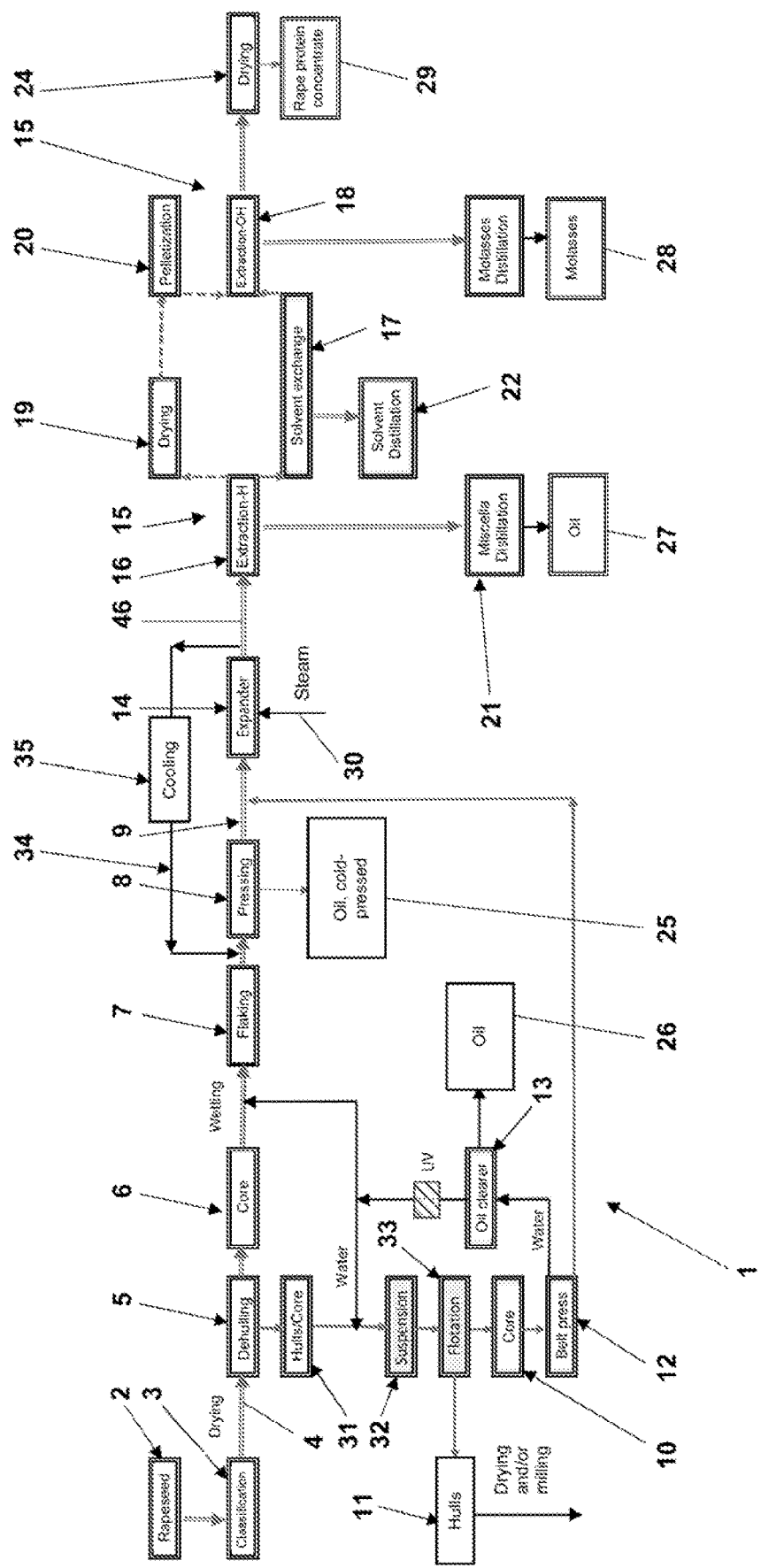
FIG. 1 is a block diagram of an apparatus according to the present disclosure and of the workflow of a method according to the present disclosure.

In the method according to the present disclosure of processing grains of a rapeseed, the grains are dehulled, wherein the grains are passed through a roller nip between dehulling rollers, and hulls are removed from a low-hull grain fraction by sieving and/or air separation, so that the hulls remaining in the low-hull grain fraction do not account for more than 4% by weight of the low-hull grain fraction. Cold-pressed rape core oil is pressed from the low-hull grain fraction, wherein a water content of the low-hull grain fraction is from 4 to 7% by weight, wherein a cake temperature in a press cake being generated is limited to 70° C., and wherein a first residual oil content is reduced to 18 to 28% by weight of a dry matter of the press cake. Pressurized steam is supplied to the press cake, and the press cake is subsequently expanded to form collets, wherein the steam is metered such that the press cake, under the influence of the steam, is temporarily heated up to above 100° C. and that the collets have a temperature of 80° C. to 95° C. after the expansion. The collets are extracted with an organic solvent, wherein a second residual oil content is reduced to 2% by weight or less of a dry matter of the collets. After the expansion, a part of the collets is returned, mixed with the low-hull grain fraction prior to the pressing, and pressed once again.

In the method according to the present disclosure, by means of returning a part of the collets, the friction of the low-hull grain fraction in pressing is increased, and, thus, limiting the cake temperature in the press cake being generated to 70° C. despite the reduction of the first residual oil content to 18 to 28% by weight of the dry matter of the press cake it is at least facilitated considerably. This returning of a part of the press cake may even be necessary to be able at all to limit the cake temperature in the press cake being generated to 70° C., despite reducing the first residual oil content to 18 to 28% by weight of the dry matter of the press cake.

In the method according to the present disclosure, the grains of the rapeseed are dehulled prior to pressing the cold-pressed rape core oil. Correspondingly, the press cake obtained by the pressing and also the collets obtained by expanding the press cake only comprise few hulls. Besides a certain increase in quality of the cold-pressed rape core oil, this may result in a considerable increase in the value of the collets. Even as such, these collets would be usable as feeding stuff. Due to the heating up of the press cake, they are uncritical from a hygienic point of view and they nevertheless have a favorable amino acid composition with at the most little undesired denaturations due to the short time of this heating up.

The collets have a continuous but open structure which is favorable for their further processing, as it will be explained in the following, and which can be preserved over the processing of the collets.

If necessary, the method according to the present disclosure can start with a cleaning of the grains of the rapeseed to remove decontaminations like stones or chaff. The grains cleaned in this way may be subjected to a classification according to grain size to separate grains which are not well-suited for the subsequent dehulling of the grains. In practice, grains smaller than a minimum size between 1.2 mm and 1.8 mm, preferably of about 1.4 mm, and larger than a maximum size between 2.6 and 3.0 mm, preferably of about 2.8 mm, may be separated. Here, the grains exceeding the maximum size may be separately dehulled with a device adjusted to their grain size, and the grains having a grain size below the minimum size may be used otherwise. Typically, the proportion of smaller grains is below 8% by weight, often below 4% by weight.

Already before or afterwards, the grains are adjusted to a moisture content between 4 to 7% by weight, preferably of about 5% by weight, for the dehulling, and dried for this purpose, if necessary. If applicable, the drying temperature should be selected such that a core temperature of 70° C., preferably of 65° C., is not exceeded to avoid a protein denaturation in drying. For breaking the hulls, the grains are passed through a roller nip between dehulling rollers, which is typically at least 20% smaller than the minimum size of the grains. The grains may also run successively through a plurality of roller nips with decreasing sizes.

Afterwards, the grains broken between the dehulling rollers are separated by sieving and/or air separation, to which an aspiration of the hulls counts as well, into the low-hull grain fraction and a high-hull grain fraction. The hulls remaining in the low-hull grain fraction do not account for more than 4% by weight, preferably they are not more than 3.5% by weight.

In the air separation, a yield of the low-hull grain fraction of typically more than 75% and preferably about 80% can be achieved. The high-hull grain fraction is complementary to the low-hull grain fraction so that the yield of high-hull grain fraction is between 20% and 25% of the rape mass used.

Cores which account for up to 40% by weight of the high-hull grain fraction are still found in the high-hull grain fraction. Thus, suitably, the high-hull grain fraction is processed further. This may be done by known methods like pressing oil at temperatures above 90° C. or solvent extraction of the high-hull grain fraction with hexane, for example. Alternatively, the high-hull grain fraction may be mixed with water of about 20 to 30° C., i.e. room temperature or about 25° C., which triggers a swelling of the fibers contained in the cores and thus a flotation of the cores to obtain a further low-hull grain fraction.

Due to another morphology, the swelling does not occur or does at least not occur to a same extent with the fibers contained in the hulls. Further, the cores differ from the hulls by a higher oil content. After swelling of the fibers in the cores, the cores have a lower density than water, whereas the hulls still have a higher density than water. Correspondingly, a flotation of the cores occurs, wherein the flotation and the separation of cores and hulls concomitant therewith may be enhanced by introducing fine gas bubbles and/or slightly low-shear stirring. The floating cores are collected as the further low-hull core fraction. They can be dewatered by means of a belt press and added to the already previously separated low-hull grain fraction. This addition may take place already prior to pressing the cold-pressed rape core oil or also afterwards. However, adding the further low-hull grain fraction into the material mainstream takes place prior to adding the pressurized steam and the subsequent expansion to form the collets. The separated hull fraction may be isolated due to its higher density than water, further purified and then utilized thermally or in a biogas plant.

After the dehulling and prior to the pressing, the low-hull grain fraction may be rolled to flakes and passed through at least one roller nip formed by flaking rollers for this purpose. Here, the temperature of the flakes is to be kept below 45° C. The flakes preferably have a flake thickness of 0.1 to 0.8 mm.

The pressing of the low hull grain fraction occurs without supply of additional heat. By means of the work executed in pressing, the temperature nevertheless increases. According to the present disclosure, this increase of temperature is limited to a maximum cake temperature of 70° C. in the press cake being generated. Thus, a trans-fatty acid content of the cold-pressed rape core oil of 0.2% is securely kept and often well undercut.

In pressing, the cold-pressed rape core oil can be collected in a first oil fraction which is heated up to not more than a first limit temperature during the pressing, and in a second oil fraction which is heated up to more than the first limit temperature during the pressing. The first oil fraction then displays the lowest thermal influence on its oil composition, and it is the highest value rape core oil obtained in the method according to the present disclosure. Even the second oil fraction is high value cold-pressed rape core oil according to Codex Alimentarius. Even a third oil fraction may be collected, which is heated up to more than a second limit temperature during pressing. The first limit temperature between the first and the second oil fractions can be between 35 and 50° C. Preferably, it is about 40° C. With the maximum cake temperature of 70° C., the first oil fraction then has an average temperature of 32 to 36° C. and clearly less than 0.1% trans-fatty acids, whereas the second oil fraction has an average temperature of 40 to 50° C. and at least clearly less than 0.2% trans-fatty acids. The second limit temperature between the second and, if any, third oil fractions may be about 60° C.

In the pressing at temperatures of not more than 70° C. according to the present disclosure, the low-hull grain fraction may be pressed down to a first residual oil content of 18 to 28% by weight or 20 to 24% by weight, i.e. about 22% by weight of its dry matter. In a suitable way, the cold-pressed rape core oil may be processed by filtration and/or sedimentation and provides cold-pressed native rape core oil in foodstuff quality.

Common screw presses for pressing oil are designed for performance, i.e. it is intended to achieve an as high throughput as possible. By dehulling the grains and the corresponding missing of grains in the screw press, there is a decrease in performance, which reduces the throughput of a low-hull oil cold-pressing as compared to a standard oil cold-pressing and causes costs as a larger screw press with higher power consumption is needed. Further, as a result of the higher power consumption, the material in the screw press is also heated up stronger.

In the method according to the present disclosure, a part of the press cake is added to the low-hull grain fraction prior to pressing to increase the friction in pressing in order to improve the performance of the low-hull oil cold-pressing by means of a screw press and to, thus, increase the profitability. In the method according to the present disclosure, this returning is not associated with the danger of a germ infestation of the screw press, because the returned part of the press case is only divided-off after the expansion and thus after the sterilization of the press cake by means of the steam added. In other words, the part of the press cake returned according to the present disclosure is a part of the collets formed thereof by means of the expansion, which are free of germs and uncritical from a hygienic point of view due to the thermal treatment. By adding the collets for increasing the friction in the cold-pressing, performance data of a common oil cold-pressing are achieved. Further, the mechanical properties of the collets are more favorable for increasing the performance in pressing than those of the press cake prior to the expansion.

It proves to be favorable, if the added portion of the press case or the collets is cooled down to a temperature of 20 to 35° C. and preferably to a temperature of 25 to 30° C., i.e. to about surrounding temperature so that it is solid and little deformable, before it is added to the low-hull grain fraction.

The returned part of the press case or the collets has a maximum particle size of 4 to 6 mm, preferably of 5 mm. Thus, it may consist of fines and fragments of the collets. Depending on the hull portion, the returned portion of the press cake or the collets replaces the previously separated hulls, so that the returned portion may account for up to 20% of the press cake or the collets and thus also of the material to be pressed. Depending on the press type, the suitably returned portion is above 5% and often between 10% and 15% of the press cake or the collets.

Not only the collets which are directly formed of the press cake by means of the expansion are suitable for the return and increase of the friction in pressing the low-hull grain fraction. Also the collets which remain after an extraction with an organic solvent for reducing their residual oil content are suitable and may be separated by sieving with a maximum size of 5 mm, dried and returned to the pressing.

Surprisingly, it arises that the collets increase the friction and thus enhance the performance of the pressing of the cold oil without reducing the quality of the pressed oil. Instead, the throughput and the press performance increase at a constant power consumption, and, thus, also the cake temperature is limited because less mechanical power is transformed into heat.

The press cake obtained by the pressing may be comminuted and be used directly, and a further low-hull grain fraction obtained by flotation or what is left after pressing thereof, may be added thereto.

For supplying the steam and the subsequent expansion, the press cake is supplied to an expander/extruder. Due to the addition of the pressurized steam, the material is compressed and also, for a short time, heated up above 100° C. and typically up to 140° C., before it is expanded and thus cooled again due to the decompression of the steam. Herein, the amount of steam has to be adjusted such that the collet temperature after the expansion is between 80 and 95° C.

The expanded objects formed are the so-called collets, which—in contrast to pellets in form of which the press cake may accrue after the pressing—have an open pore structure that facilitates their further processing. The short time temperature increase to above 100° C. and up to 140° C. caused by steam and pressure inhibits enzymes and salmonellae and stabilizes the pore structure, which has been made hygienic, stable and elastic, such that the return of the collets for replacing the hulls in the cold-pressing becomes possible. Further, the short time temperature increase results in a partial denaturation of the proteins contained in the collets. This partial denaturation does not essentially limit the feeding stuff or foodstuff value of the proteins. Typically, the collets produced according to the present disclosure display a reduction in their protein solubility of not more than 20% as compared to the press cake. However, the partial denaturation of the proteins has the result that the proteins remain in the collets and do not get lost in the subsequent extraction of the collets to extract further oil and undesired ingredients. The amount of steam and the resulting temperatures are adjusted correctly, if the protein denaturation of the collets is low as compared to the press case and the protein solubility measured via NSI (Nitrogen Solubility Index) or PDI (Protein Dispersibility Index) does not drop below 80% of the protein solubility in the press cake.

The collets are extracted by means of an organic solvent to reduce the collets to a second residual oil content of less than 2% by weight or of 0.3 to 1.3% by weight of their dry matter. Besides hexane, any other organic solvent in which oil is dissolved well, like for example isopropanol, may be used as the organic solvent. The use of azeotropic or pure alcohol in form of ethanol is possible. The alcohol may be bio alcohol so that processing of bio rapeseed results in a bio rape protein product.

For the extraction, and likewise for all steps of the method according to the present disclosure described up to now, industrial standard technologies may be used, like, for example, carousel extractors and belt extractors. The solvent employed encloses the collets in a percolation, wherein a miscella results from the solvent, in which the oil contained in the collets is dissolved. This miscella is separated from the solvent in a known way by distillation so that the oil remains. This oil is extracted rape core oil.

The extracted collets may be dried and comminuted, and in doing so a high protein containing rape protein meal having a protein content of more than 45% by weight, preferably of more than 48% by weight of its dry matter is generated, that is, like HP soybean meal, nearly free of hulls. This rape core meal may be further processed by known techniques.

A possible processing of the collets dried after the extraction with the organic solvent is the alcohol-water-extraction for removing non-proteinogenic ingredients and enrichment of the proteins to form a rape protein concentrate.

For this purpose, the collets are at first sieved to separate fines and collet fragments which inevitably accrue due to the mechanic load during drying. If these fines are used to increase the friction of the cold-pressing, a sieve is selected which holds back particles starting from 5 mm; if the material is further processed in an alcoholic extraction, a cut off limit of 1 mm is sufficient.

The collets from which the fines have been removed, are then subjected to a swelling in an alcohol-water-mixture, 15 minutes being sufficient for this purpose. The swelling should be non-destructive, before the collets saturated with the alcohol-water-mixture are subjected to a further belt extraction which may occur analogously to extraction with the organic solvent. It is a suitable simple implementation to arrange a swelling screw upstream of the belt extraction for carrying out the swelling continuously. However, any other technical measures are suitable which allow for a continuous swelling.

The swelling may be operated with the alcoholic miscella of the alcoholic belt extraction, which would equate to the drain towards the distillation. Thus, the swelling screw results in a further extraction stage.

Alternatively, the collets extracted with the organic solvent may be further processed directly, i.e. without drying and/or comminution.

Thus, in order to not destroy the structure of the collets and produce fines in this way, the collets may be demoistured by simple drainage and dripping off the organic solvent in front of the output of the solvent extractor. In this way, typically more than 50% of the solvent can be removed out of the collets. At the output of the solvent extractor, the collets are collected and transported in a non-destructive way by a conveyor unit, like for example by a conveyor screw or a conveyor belt. The conveyor unit conveys the solvent wet collets without shearing to a filter which is subdivided into separation areas. The material is in a non-destructive way transferred onto the filter. The filter may be a closed rotation filter or a belt filter, like, for example, a vacuum belt filter. A rotary valve may be installed between the conveyor unit and the filter to achieve a boundary between the solvent areas. After the solvent wet collets have been arranged on the filter, the filter is brought into a first position in which the solvent content of the solvent-wet collets is reduced further. This may be accelerated by applying a vacuum to a vacuum belt filter. Thus, a solvent content of below 40% by weight can be achieved. Then, the solvent, due to the capillary effect, has been concentrated towards the filter so that, in the capillaries in the collets above the solvent, a solvent-poor layer has been formed, which only wets the surface of the capillaries of the collets. If the organic solvent is hexane, pure alcohol or a water-alcohol-azeotrope may be applied to replace the hexane, starting from a second position of the filter. Due to the resulting layers of the solvents in the collets, a nearly plain alcohol-hexane boundary layer results so that only a small mixed fraction hexane/alcohol/water is formed. After two to three washing steps, the hexane in the structure of the collets is, without residue, replaced by alcohol. In doing so, only small volumes of a hexane/alcohol-mix fraction result which can separately be reprocessed by distillation. This is just an example. Any other technical equipment which allows for a solvent exchange may be used.

An extraction of the collets with an aqueous alcohol solution to obtain a purified rape protein concentrate may follow to the solvent exchange. Here, the aqueous alcohol solution may comprise 70 to 96% by volume alcohol. 80 to 90% by volume alcohol are preferred. This alcohol extraction, like, for example, with ethanol, serves for removing toxins and other anti-nutritive ingredients. At the preferred alcohol concentration, the swelling of the fibers contained in the rape material and thus the concomitant increase in volume remains small. Thus, it is also inhibited that the percolation rates of the collets strongly decrease as a result of the swelling. A too strong swelling would close the capillaries in the collets.

Preferably, the collets are extracted with the aqueous alcohol solution in a countercurrent flow. Here, a ratio of dry matter to solvent of 1:2 to 1:6 is suitable. Preferably, at least 10 extraction steps are passed in the countercurrent flow. At the end of the extraction, a replacement washing with azeotropic, i.e. 96% alcohol, may take place to ease the drying of the extracted material. The extracts from the extraction stages are collected. After distilling-off the alcohol, a rape molasses remains.

The azeotropic water-alcohol-solution may be collected separately and used for replacing hexane by alcohol in the solvent replacement zone. Here, it is an advantage that the recovery of the alcohol-water-mixture of the alcohol-water-extraction needs no rectification and thus remains compact. The rectification of small volumes is reserved for the solvent replacement which separates the hexane-alcohol-water-mixture.

An alcohol extraction may also be carried out with preparing a suspension by milling in the aqueous alcohol solution. The suspension is then purified via centrifuges in a countercurrent flow. This may be executed as the only aqueous alcohol extraction or subsequently to an existing belt extraction. Vacuum belt extractors are also suitable for the alcohol-washing of the suspension.

The suspension washing is suited for after-processing after the belt extraction provided, because many impurities are immobilized in the collets which only get free when opening the collets. Thus, the suspension washing fulfills the task of fine-purification to increase the quality of the protein concentrate and the protein content.

The purified rape protein concentrate may be dried by toasting, flash-drying or vacuum-drying. The dried rape protein concentrate has a protein content of above 60% by weight related to its dry matter.

The apparatus according to the present disclosure which is configured for carrying out the method of processing grains of a rapeseed according to the present disclosure comprises dehulling rollers forming a roller nip for dehulling the grains, a separation unit arranged downstream of the roller nip and having at least one sieve or air separator for separating a low-hull grain fraction from a high-hull grain fraction, flaking rollers for rolling the low-hull grain fraction into flakes, a screw press for pressing cold-pressed rape core oil from the flakes, wherein the screw press outputs a press cake, and a return device which is configured for returning a part of the press cake back to the screw press. The apparatus according to the present disclosure further comprises an expander arranged downstream of the screw press and configured for supplying pressurized steam to the press cake and for subsequently expanding the press cake to form collets, and an extractor arranged downstream of the expander and configured for extracting the collets with an organic solvent, The return device is configured for returning the part of the press cake after the expander, i.e. in form of a part of the collets.

In practice, the return device may be configured for separating the returned part of the press cake, i. e. of the collets, by sieving-off a particle fraction having a maximum particle size in a range from 4 to 6 mm from the remainder of the collets. This sieving may take place prior to and/or after the extraction with the organic solvent in the extractor.

The return device may comprise a cooler which is configured for cooling the part of the press cake. The cooler may, for example, include a cooling air blower which results in cooling the part of the press cake by evaporation cooling due to evaporation of moisture contained.

The screw press may have a press screw rotating about a horizontal rotation axis and a sieve box, wherein, in an oil collection basin arranged below the sieve box, a weir extending crosswise with regard to the rotation axis, that separates an at first pressed first oil fraction from a later pressed second oil fraction of the cold-pressed rape core oil in the oil collection basin, is shiftable in the direction of the rotation axis. By shifting the weir, the above explained first limit temperature between the first and the second oil fraction may be adjusted. If a drive is provided which shifts the weir in the direction of the rotation axis depending on a signal of at least one oil temperature sensor arranged at the weir, the first limit temperature can be controlled to a predetermined value, even if the temperature distribution over the screw press varies. The sieve box of the screw press may be made of strainer rods.

Further, the apparatus according to the present disclosure may comprise a flotation basin to separate the high-hull grain fraction by flotation in water into a further low-hull grain fraction and a hull fraction. The flotation basin may optionally comprise a pressurized air connector discharging at or close to the bottom of the flotation basin and/or a stirrer.

Further, the extractor arranged downstream of the expander may be configured for drying the collets or to subject the still solvent-wet collets to a solvent replacement, and to then extract the collets with an aqueous alcohol solution.

Referring now in greater detail to the drawings, FIG. 1, in a block diagram, illustrates an apparatus 1 according to the present disclosure and at the same time the workflow of a method according to the present disclosure. Rapeseed out of a bunker 2 is subjected to a classification and cleaning in a sieving unit 3. From the sieving unit 3, cleaned grains 4 within a predetermined grain size range are obtained. After drying—if needed—to adjust a moisture of the grains 4 of about 5% by weight, the grains are dehulled by dehulling rollers which form a roller nip and which are combined with a downstream separation device. A low-hull grain fraction 6 and a high-hull grain fraction 31 result. The low-hull grain fraction 6 is rolled to flakes by flaking rollers 7. In a screw press 8, cold-pressed rape core oil 25 is pressed from the flakes. A resulting press cake 9 is supplied to an expander 14.

On the other hand, water is added to the high-hull grain fraction 31 to form a suspension 32 in which the fibers contained in a core portion of the high-hull grain fraction 31 swell. Afterwards, a flotation 33 occurs in which a further low-hull grain fraction 22 floats and thus separates from a hull-fraction 11. The hull-fraction 11 may be dried and/or ground and, for example, be used in an incinerator or biogas plant. The further low-hull grain fraction 10 is pressed in a belt press 12. Its solid content is added to the press cake 9 in front of the expander 14. Water pressed off by the belt press 12 is processed in an oil clearer 13 in which oil 26 is separated. The purified water is UV-treated for disinfection and used again. The press cake 9 and the further low-hull grain fraction 10 are comminuted and then supplied to the expander 14. In the expander 14, the temperature of the press cake 9 is, for a short term, increased to above 100° C., typically up to 140° C., by supplying pressurized steam. When exiting out of the expander, the steam decompresses and cools down the material exiting in form of collets 46 to 80 to 95° C. In an extractor 15, the collets 13 are at first subjected to a solvent extraction with, for example, hexane. After solvent exchange 17, an aqueous alcohol extraction 18 is carried out. Instead of the alcohol exchange, a drying 19 of the solvent-extracted collets may be carried out. Pelletization 20 and a further expansion of the dried material may follow, or a rape protein meal resulting from the drying 19 is output as a product.

The alcohol extraction 18 may also be carried out with collets resulting from the drying 19 or with the rape protein meal. In a distillation 21, rape core oil 27 extracted from the miscella of the solvent extraction 16 is obtained. In a distillation 22, solvent from the solvent exchange 17 is recovered. Molasses 28 results from a distillation 23 of the alcoholic extract from the alcohol extraction 18. A drying 24 of the residue of the alcoholic extraction 18 results in a purified rape protein concentrate 29.

A return device 34 returns a part of the press cake 9 after the expansion at the output of the expander 14 back into the screw press 8. In practice, fines are sieves off the collets 46 exiting the expander 14, cooled down with a cooler 35 of the return device 34 down to a temperature <35° C., and then added to the rolled low-hull grain fraction 6 to increase the friction in the screw press 8. A certain friction of the pressed low-hull grain fraction 6 and the screw press 8 is required to achieve a sufficient pressing performance with regard to the employed mechanical energy and thus also with regard to the heating up of the press cake 9 formed in the screw press 8 as well as the residual oil content of the press cake 9. This friction is provided by the cooled down collets, without hygienic problems due to the return of a part of the press cake 9 into the screw press 8, because the collets are made hygienic by the expansion in the expander 4. Further, the collets 3 have better mechanical properties for increasing the friction in the screw press 8 than the press cake 9 in front of the expander 14.

Figure 2:
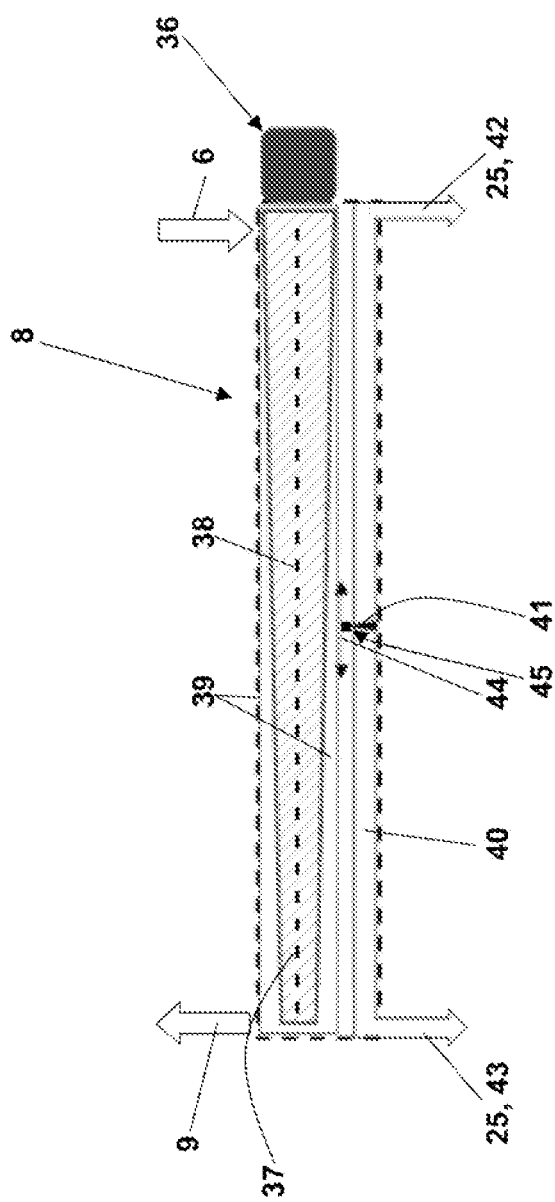
FIG. 2 shows a preferred embodiment of a screw press of the apparatus according to the present disclosure.

The embodiment of the screw press 8 of the apparatus 1 according to the present disclosure depicted in FIG. 2 has an electric drive 36, which rotates a press screw 37 about a horizontal rotation axis 38 with respect to a sieve box 39 to press the rape core oil 25 from the low-hull fraction 6, wherein the press cake 9 is formed. In direction of the rotation axis 38, at first a first oil fraction 42 is pressed in which the rape core oil 25 does not exceed a limit temperature. Afterwards, a second oil fraction 43 is pressed which still consists of cold-pressed rape core oil, because no heat is added to the screw press 8. However, there is a temperature increase in the screw press 8 along the rotation axis 38 due to the screw press 37 acting upon the low-hull grain fraction 6. This increase in temperature is limited to a maximum cake temperature of the press cake 9 of 70° C. Thus, also the second oil fraction 43 has a trans-fatty acid content of less than 0.2%. The trans-fatty acid content of the first oil fraction is below 0.1%. In an oil collection basin 40 arranged below the sieve box 39, the two oil fractions 42 and 43 are separated by a weir 41 extending crosswise with respect to the rotation axis 38. Depending on an oil temperature sensor 45 arranged at the weir 41, the weir 41 is shifted along the rotation axis 38 by a drive 44 which is indicated here by means of a double arrow such that the oil temperature sensor 45 does not sense a higher temperature than the limit temperature of the first oil fraction 42.

EXAMPLE 10 tons of rape, like for example 00 rape, are cleaned. Depending on the level of contamination, 2 to 3% of the starting material are removed. In a subsequent classification, up to 4% grains having a grain size below 1.6 mm and above 2.8 mm are removed. 94% of the original rapeseed having a moisture content between 7 and 9% are forwarded to the drying.

At 60 to 70° C. the rapeseed is dried to a moisture of 5% by weight, and, after cooling down to 30° C., the rapeseed is forwarded to the dehulling rollers 5. The separation into the high-hull grain fraction 31 and the low-hull grain fraction 6 results in a yield of about 80% by weight low-hull grain fraction and 20% by weight high-hull grain fraction 31. The high-hull grain fraction 31 has 30 to 40% by weight core material, whereas the low-hull grain fraction 6 has less than 4% hulls. The high-hull grain fraction 31 contains about 20% by weight oil and 16% by weight protein in total. The high-hull grain fraction 31 is mixed with water of 20 to 30° C. With regard to weight, a ratio of 1 to 6 results, i.e. at least 6 kg water are allotted to 1 kg high-hull grain fraction 31. After addition of the water, the resulting suspension 32 is set into motion and mixed by slightly stirring without shearing. The fibers of the cores in the high-hull grain fraction 31 swell for 15 minutes. In the subsequent flotation 23 of the stirred high-hull grain fraction, a separation into the floating further low-hull grain fraction 10 and the hull fraction 11 takes place. For enhancing the flotation, finely dispersed air may be blown in. The swollen cores of the further low-hull grain fraction 10 are collected by a belt press 12. The water is separated and, in a close loop, added to a new high-hull grain fraction 31. The further low-hull grain fraction 10 collected by the belt press 12 is dewatered and added to the press cake 9 in front of the expander 14.

Afterwards, the low-hull grain fraction 6 is rolled to flakes by means of the flaking rollers 7. The low-hull grain fraction 6 is only rolled to such an extent that a temperature of the flakes is kept below 45° C. To keep this temperature, the flaking rollers 7 may be cooled. The flakes are directly forwarded to the screw press 8. In the screw press 8, the flakes are compressed by the press screw 37 of the screw press 8. The exiting cold-pressed rape core oil 25 is collected separated according to temperature ranges. The first oil fraction 42 with a temperature of 35 to 40° C. is native cold-pressed virgin rape core oil and has a content of trans-fatty acids of below 0.1%. The second oil fraction 43 between 45 and 60° C. is native cold-pressed rape core oil 25 and has a content of trans-fatty acids of below 0.2%. Both oil fractions together result into 2.8 tons cold-pressed rape core oil 25, wherein 40% are virgin rape core oil and 60% are native cold-pressed rape core oil. The press cake 9 exiting the screw press 8 comprises a residual oil content of 22 to 23% by weight.

The press cake 9 is comminuted, the further low-hull grain fraction 10 from the belt press 12 is added, and it is forwarded to the expander 14. In the expander 14, the press cake is heated by supplying pressurized steam 30 such that, after exiting out of the expander 14, a temperature between 80 and 95° C. of the collets 46 formed as an expansion product is achieved. The collets 46 are cooled down. Fines and fragments having a particle size up to 5 mm are sieved off the collets 46. The portion of the fines is 3 to 6% by weight. 5 to 20% by weight of the collets are added to the low-hull grain fraction 6 in front of the screw press 8 in form of the fines and of fragments and increase the friction in cold-pressing the rape core oil 25.

Collets 46 larger than 5 mm are extracted in a carousel extractor of the extractor 15 with hexane at 60° C. in multiple stages in countercurrent under percolation. The resulting miscella is distilled, and the hexane is once again supplied to the process. The extraction time is between 1 and 3 hours, preferably about 2 hours. An extracted rape core oil 27 having a mass of 1.1 tons arises.

After the extraction 16, the hexane-wet collets 46 are drained and demoistured. The collets 46 may then either be forwarded to a drying 19 to form a high protein containing rape protein meal or to a solvent exchange 17.

If the drying 19 of the hexane-wet collets 46 is selected, the dried collets 46 may either be ground to a protein meal or at first sieved with a sieve of 1 mm to reduce the fines. The collets 46 freed from the fines are then forwarded to a swelling screw. The screw transports the collets and handles the collets 46 over to the belt extractor 18 for extraction with aqueous alcohol solution of 80% alcohol.

The solvent exchange 17 may be implemented with the aid of a vacuum belt filter. After further transport, the hexane contained is over-layered with ethanol of 96%. In the further course, the ethanol is sucked through the collets, wherein the ethanol is added in a countercurrent flow. After 3 cycles, the hexane is replaced by ethanol, and the collets are now overlayered with ethanol of 80%, and they swell for a swelling time of 15 minutes in a countercurrent flow. For the swelling, the alcoholic solution (molasses 28) exiting out of the subsequent alcohol extraction 18 may be used. The swollen material is put out, loosened up while being put out, and forwarded to a belt extractor of the subsequent alcohol extraction 18 in which the collets are further extracted with ethanol of 80%, wherein the extraction time is 1 to 3 hours. The final alcohol stage may be a replacement of the alcohol-water-mixture with ethanol of 96% to reduce the energy costs of the subsequent drying 24. Such an azeotropic alcohol may also be used for replacing the hexane in the solvent exchange 17. This provides the advantage that only little solvent has to be rectified in the distillation 22.

The alcohol from the alcohol extraction 18 is distilled off and reused. The molasses 28 remains. The dry matter of the molasses 28 corresponds to about 10 to 12% of the rapeseed processed. The rape protein concentrate 29 purified by the alcohol extraction is dried and accounts for 3 tons.

The rape protein concentrate 29 has the following composition:

| | |
|---|---|
| protein content related to dry matter (N*6.25) | 64.0% ± 2%, |
| dry matter | 90% ± 2% |
| oil content | 0.4% ± 0.2% |
| glycosinolate content | ≤1 µmol/g |
| polyphenols | ≤0.1% |
| sinapines | ≤0.1% |
| phytic acid | 3% ± 2% |
| pale color | |
| neutral taste | |
| yield of concentrate related to classified rape | 30% |

The exemplary amino acid composition displays a composition getting close to that one of rapeseed:

| TYPCIAL AMINO ACIDS | | on Sample g/100 g DM | on Protein g/100 g Protein | |
|---|---|---|---|---|
| Aspartic Acid | Asp | 4.94 | 8.13 | NE |
| Glutamic Acid | Glu | 11.16 | 18.36 | NE |
| Hydroxyprolin | Hyp | 0.17 | 0.28 | NE |
| Serine | Ser | 2.79 | 4.59 | NE |
| Glycine | Gly | 3.55 | 5.84 | NE |
| Histidine | His | 1.86 | 3.06 | E |
| Arginine | Arg | 4.45 | 7.33 | (NE) |
| Threonine | Thr | 2.99 | 4.92 | E |
| Alanine | Ala | 2.80 | 4.60 | NE |
| Proline | Pro | 3.68 | 6.06 | NE |
| Tyrosine | Tyr | 1.60 | 2.63 | (NE) |
| Valine | Val | 3.58 | 5.89 | E BCAA |
| Methionine | Met | 1.18 | 1.94 | E BCAA |
| Isoleucine | Ile | 2.73 | 4.49 | E |
| Leucine | Leu | 4.73 | 7.78 | E BCAA |
| Phenylalanine | Phe | 2.72 | 4.47 | E |
| Lysine | Lys | 4.05 | 6.66 | E |
| Cysteine/Cyst | Cys | 1.68 | 2.76 | (NE) |
| Tryptophan | Trp | 1.03 | 1.69 | E |

NE = not essential
E = essential
BCAA = branched-chain amino acids

| Essential AA | | | on AA |
|---|---|---|---|
| standard | 24.87 | 40.90 | 40% |
| for Infants/children | 35.26 | 58.00 | 57% |
| BCAA | 9.49 | 15.61 | 15.4% |

The exemplary oil analysis shows a composition getting close to that one of rapeseed:

| oil analysis | |
|---|---|
| saturated fatty acids | 6.3% |
| monounsaturated fatty acids | 66.0% |
| polyunsaturated fatty acids | 27.6% |
| trans-fatty acids | 0.06% |
| omega-3 fatty acids | 9.2% |
| omega-6 fatty acids | 18.4% |
| water | 0.05% |
| phosphor | <2.0 mg/kg |
| sulfur | 3.0 mg/kg |

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of processing grains of a rapeseed, the method comprising the steps of:
   dehulling the grains, wherein the grains are passed through a roller nip between dehulling rollers,
   separating a high-hull grain fraction from a low-hull grain fraction by sieving and/or air separation such that the hulls remaining in the low-hull grain fraction do not account for more than 4% by weight of the low-hull grain fraction,
   pressing cold-pressed rape core oil from the low-hull grain fraction,
   wherein a water content of the low-hull grain fraction is from 4 to 7% by weight,
   wherein a cake temperature in a press cake being generated is limited to 70° C., and
   wherein a first residual oil content is reduced to 18 to 28% by weight of a dry matter of the press cake,
   supplying pressurized steam to the press cake and subsequently expanding the press cake to form collets, wherein the steam is metered such that the press cake, under the influence of the steam, is temporarily heated up above 100° C. and the collets, after the expansion, have a temperature from 80° C. and 95° C.,
   extracting the collets with an organic solvent, wherein a second residual oil content is reduced to 2% by weight or less of a dry matter of the collets,
   separating a part of the collets prior to or after extracting the collets with the organic solvent, and adding the separated part of the collets to the low-hull grain fraction prior to the step of pressing.

2. The method of claim 1, wherein the part of the collets consists of smaller parts of the collets separated from a remainder of the collets by sieving.

3. The method of claim 2, wherein the smaller parts of the collets are separated from the remainder of the collets by sieving off a particle fraction having a maximum particle size selected from a range from 4 to 6 mm.

4. The method of claim 1, wherein the part of the collets is cooled down to a temperature selected from a range from 20 to 35° C. prior to the step of pressing.

5. The method of claim 1, wherein the part of the collets accounts for up 5 to 20% by weight of the press cake.

6. The method of claim 1, wherein, in the step of pressing, no heat is added or heat is removed.

7. The method of claim 1, comprising dividing the high-hull grain fraction up into a further low-hull grain fraction and a hull fraction by flotation in water, the further low-hull grain fraction being added to the low-hull grain fraction prior to the step of pressing or to the press cake prior to the step of supplying the pressurized steam.

8. The method of claim 1, comprising, prior to the step of pressing, rolling the low-hull grain fraction which has a moisture content of 5 to 8% by weight of its dry matter to flakes.

9. The method of claim 8, wherein, in the step of rolling, the flakes are rolled to a flake thickness of 0.1 to 0.8 mm, and kept at a flake temperature of not more than 45° C.

10. The method of claim 1, wherein, in the step of pressing, the cold-pressed rape core oil is collected in a first oil fraction, that is not heated up beyond a first limit temperature during pressing, and in a second oil fraction, that is heated up to more than the limit temperature during pressing, wherein the limit temperature is between 4° and 50° C.

11. The method of claim 10, wherein, in the step of pressing, the low-hull fraction is pressed by means of a screw press having a press screw rotating about a horizontal rotation axis and a sieve box extending around the press screw, wherein, in an oil collection basin arranged beneath the sieve box, a weir running crosswise with regard to the rotation axis is continuously shifted in direction of the rotation axis such that it separates the first oil fraction and the second oil fraction of the cold-pressed rape core oil in the oil collection basin from one another.

12. The method of claim 11, wherein, in the step of pressing, the weir is shifted in direction of the rotation axis depending on a signal of at least one oil temperature sensor arranged at the weir.

13. The method of claim 1, comprising, prior to the step of supplying, breaking the press cake up into pieces.

14. The method of claim 1, wherein, in the step of extracting, the collets are extracted with the organic solvent to reduce the second residual oil content to 0.3 to 1.3% by weight of the dry matter of the collets.

15. The method of claim 1, wherein, in the step of extracting, the organic solvent is selected from hexane or alcohol of at least 95%.

16. The method of claim 1, wherein, after extracting the collets with the organic solvent, the solvent-wet collets are dried in a way conserving their porous structure, or subjected to a solvent exchange, in which at least one exchanging solvent is used, that is selected from pure alcohol and a water-alcohol azeotrope.

17. The method of claim 1, wherein, after extracting the collets with the organic solvent, the collets are extracted with an aqueous alcohol solution to obtain a purified rape protein concentrate, wherein the aqueous alcohol solution comprises 70 to 96% by volume alcohol.

18. The method of claim 17, wherein the collets are milled in the aqueous alcohol solution to form a suspension, and extracted with the aqueous alcohol solution in a countercurrent flow.

19. The method of claim 17, wherein the aqueous alcohol solution is replaced by ethanol of at least 95%.

20. The method of claim 17, wherein the purified rape protein concentrate is dried by toasting, flash drying or vacuum drying.

\* \* \* \* \*